US00RE35587E

United States Patent [19]

Okamura et al.

[11] E Patent Number: Re. 35,587

[45] Reissued Date of Patent: Aug. 19, 1997

[54] TOOL FOR SQUEEZING OUT HIGH-VISCOSITY LIQUID FROM TUBE CONTAINER

[75] Inventors: Naomi Okamura, Kuki; Akio Nimura, Kawaguchi; Takao Hino, Yokohama, all of Japan

[73] Assignee: Cemedine Co. Ltd., Tokyo, Japan

[21] Appl. No.: 560,929

[22] Filed: Nov. 20, 1995

Related U.S. Patent Documents

Reissue of:

[64] Patent No.: 5,263,610
Issued: Nov. 23, 1993
Appl. No.: 830,151
Filed: Feb. 3, 1992

[30] Foreign Application Priority Data

Feb. 8, 1991 [JP] Japan ..... 3-039456
Oct. 14, 1991 [JP] Japan ..... 3-293619

[51] Int. Cl.[6] ..... B65D 35/34
[52] U.S. Cl. ..... 222/100; 222/103
[58] Field of Search ..... 222/95, 99, 100, 222/103

[56] References Cited

U.S. PATENT DOCUMENTS 2,726,015 12/1955 Poock ..... 222/98
2,748,981 6/1956 Bean ..... 222/97
2,808,963 10/1957 Farrow ..... 222/100
3,910,460 10/1975 Hausmann et al. ..... 222/99
3,920,157 11/1975 Yeung ..... 222/100
4,359,173 11/1982 Williams ..... 222/100
4,576,314 3/1986 Elias et al. ..... 222/99 X
5,058,771 10/1991 Curtis ..... 222/99

FOREIGN PATENT DOCUMENTS 1135211 4/1957 France .
194112 2/1938 Switzerland .
2071602 9/1981 United Kingdom .

*Primary Examiner*—Joseph Kaufman
*Attorney, Agent, or Firm*—Nikaido, Marmelstein, Murray & Oram LLP

[57] ABSTRACT

A tool for squeezing out a high-viscosity liquid from a flexible plastic tube container includes a spool having a slot in which the bottom of the tube container is received and locked, and a container holder having a pair of opposed bearing portions frictionally and rotatably supporting thereon a body of the spool, and a pair of opposed engagement portions engageable with a body of the tube container as the tube container is wound on the spool body from the bottom thereof. When a rotational force or torque on the spool is released, the spool is urged to rotate in the reverse direction by a resilient force stored in a portion of the flexible plastic tube container wound on the spool body. However, partly due to a friction acting between the spool body and the bearing portions, and partly due to the engagement between one of the engagement portions and the tube container, the spool is held immovable relative to the container holder against the resilient force of the tube container.

11 Claims, 3 Drawing Sheets

TOOL FOR SQUEEZING OUT HIGH-VISCOSITY LIQUID FROM TUBE CONTAINER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a squeezing tool used in combination with a tube container of a high-viscosity liquid, such as a sealant, an adhesive, a grease or a tooth paste, for squeezing out the high-viscosity liquid from a spout of the tube container.

2. Description of the Prior Art

Conventionally, when a sealant is used as a joint sealant for bath rooms, sash windows, for example, the sealant composed of a high-viscosity liquid is filled in a tube container made of metal such as aluminum or lead, and after which a squeezing nozzle is fitted with a spout of the tube container for completely and neatly sealing a narrow part with the sealant.

However, partly because the nozzle is tapered and has a small discharge hole, and partly because the sealant is composed of a high-viscosity liquid as stated above, a large pressure or force must be exerted on the tube container in order to squeeze out the sealant from the tube container. In addition, the sealant must be squeezed out entirely from the tube container to avoid wastage. Taking these demands into account, it has been a known practice to use a squeezing tool for facilitating squeezing of the sealant from the tube container. The known squeezing tool includes a spool having a slot in which a bottom of the tube container is received and locked, and a grip portion or handle integrally formed with the spool for rotating the spool. The squeezing tool as attached to the tube container winds up the tube container on the spool from the bottom of the tube container during which time the tube container is compressed and hence the sealant is squeezed out from the tube container through the nozzle.

In recent years, from the point of view of aesthetical appearance and utility, the metallic tube containers have been replaced by flexible plastic tube containers such as laminated tubes or polyethylene tubes. In the case where the known squeezing tool is used with the flexible plastic tube containers, the grip portion of the squeezing tool is manipulated to rotate the spool in one direction for winding up the flexible plastic tube container from the bottom thereof, so that a sealant is squeezed out from the flexible plastic tube container. However, when the grip portion is released, the spool and the grip portion (i.e., the tool itself) is forced to rotate in the opposite direction due to the resiliency of the flexible plastic tube container. The flexible plastic tube container is unwound from the spool, accordingly.

SUMMARY OF THE INVENTION

With the foregoing drawbacks of the prior art in view, it is an object of this invention to provide a tool for squeezing out a high-viscosity liquid from a flexible plastic tube container without causing unwinding of the flexible plastic tube container even when a winding force torque exerted on a spool of the tool is released.

According to this invention, there is provided a tool for squeezing out a high-viscosity liquid from a soft plastic tube container, the tool comprising: a spool having a longitudinal slot for receiving and locking therein the bottom of the soft plastic tube container; and a container holder for holding therein the tube container, the container holder being composed of a pair of opposed bearing portions frictionally and rotatably supporting the spool, and a pair of opposed engagement portions integral with the bearing portions and engageable with the tube container to keep the tube container immovable against rotation about a longitudinal axis of the spool when the flexible plastic tube container is wound on the spool from the bottom thereof.

In use, the container holder is fitted over the flexible plastic tube container from the bottom thereof and the bottom of the tube container is received an locked in the slot of the spool. Then, while holding the tube container with one hand, the user can rotate the spool in one direction to wind up the tube container. With this winding, the high-viscosity liquid is squeezed out from a spout of the tube container. During that time, the container holder tends to rotate together with the spool due to the friction acting between the spool and the bearing portions of the container holder. However, rotation of the container holder is prevented by one of the engagement portions which is held in abutment with the tube container. Thus, the tube container can be wound on the spool stably and reliably. When the user releases the spool, the spool is urged to rotate in the reverse direction by a resilient force stored in a portion of the tube container wound on the spool body. In this instance, however, partly due to a friction acting between the spool body and the bearing portions of the container holder, and partly due to the abutting engagement between the other of the engagement portions and the tube container, the spool is held immovable relative to the container holder and also to the tube container. Thus, the tube container is firmly held in position against unwinding.

The bearing portions have a pair of aligned bearing holes having a diameter slightly smaller than the outside diameter of the spool, and a plurality of slits extending radially outwardly from each of the bearing holes. The spool received in the bearing holes is rotatable against a friction acting between the spool body and the bearing portions.

The squeezing tool may further include a friction means disposed on at least one of the spool and the bearing portions for producing a friction acting between the spool and the bearing portions to prevent the spool from rotating in the opposite direction relative to the bearing portions. The friction means comprises a roughened outer surface of a portion of the spool supported by each of the bearing portions or a row of teeth formed on an outer peripheral surface of the spool at a portion supported by each of the bearing portions. The roughened surface and the teeth on the spool may be used solely or in combination with a row of teeth formed on a peripheral wall of the bearing hole.

In addition, the bearing portions may have a generally C shape and each include a cutout recess contiguous to the bearing hold. The spool can readily be assembled with the container holder by forcing the spool body into snap-in-fitting with the bearing holes through the cut-out recesses in the bearing portions.

The container holder includes a rectangular hollow holder body having an elongate strip which is separable from the remainder of the holder body and can be locked with the remainder of the holder body. The container holder thus constructed can be developed or spread into a substantially flat configuration. The spreadable container holder can easily be manufactured by molding and is easy to transport.

It is preferable that the container holder is formed of a resiliently deformable material. The resiliently deformable container holder is able to entirely squeeze out the high-viscosity liquid from the tube container.

The above and other objects, features and advantages of the present invention will become more apparent from the following description when making reference to the detailed description and the accompanying sheets of drawing in which preferred structural embodiments incorporating the principles of the present invention are shown by way of illustrative examples.

DETAILED DESCRIPTION OF THE INVENTION

The invention will be described below in greater detail with reference certain preferred embodiments illustrated in the accompanying drawings.

Figure 1:
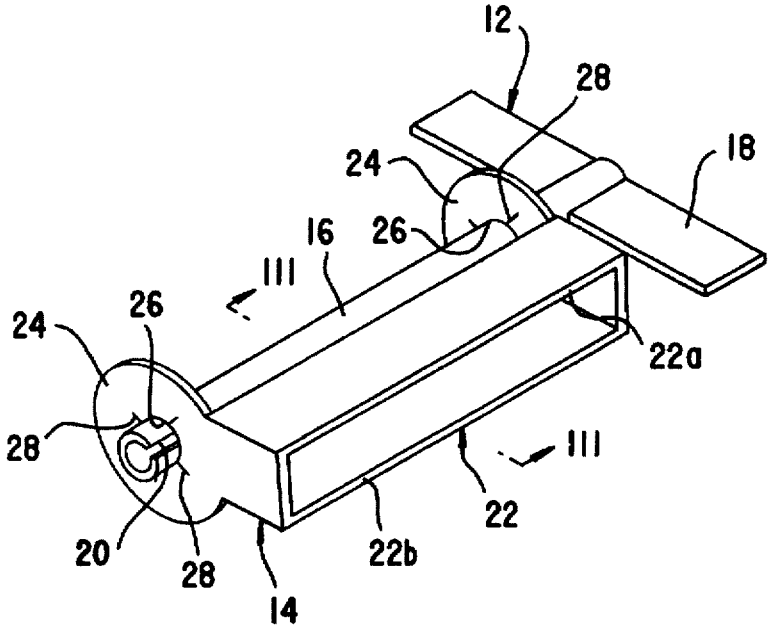
FIG. 1 is a perspective view of a tool for squeezing out a high-viscosity liquid from a flexible plastic tube container according to an embodiment of the present invention.
Figure 2:
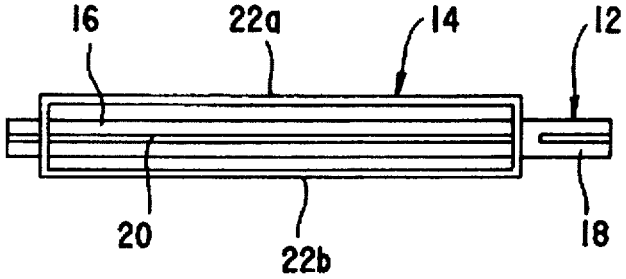
FIG. 2 is a front elevational view of the squeezing tool.
Figure 3:
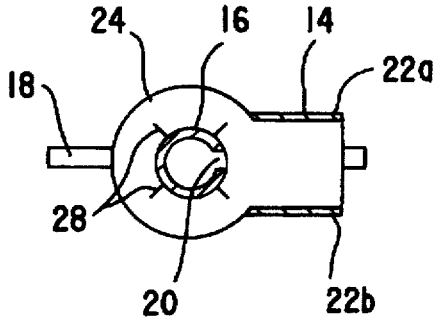
FIG. 3 is a cross-sectional view taken along line III—III of FIG. 1.

FIGS. 1 through 3 show a squeezing tool 10 according to a first embodiment of this invention. The squeezing tool 10 generally comprises a spool 12 on which a flexible plastic tube container T containing a high-viscosity liquid such as a sealant is wound from the bottom thereof, and a container holder 14 for holding the tube container T against rotation relative to the reel 12. The flexible plastic tube container T suitable for use with the sealant includes a laminated tube having a moisture-proof film such as an aluminum foil, and a polyethylene tube.

The spool 12 includes a tubular spool body 16 and a grip portion 18 in the form of a wing handle formed integrally with an end of the spool body 16 for rotating the spool body 16. The spool body 16 has a longitudinal slot 20 for receiving and locking therein a bottom end of the tube container T.

The container holder 14 includes a rectangular hollow holder body 22 for holding therein a body of the tube container T, and a pair of opposed bearing portions 24, 24 projecting rearward from opposite sides of the holder body 22 for rotatably supporting thereon the spool body 16. The holder body 22 has upper and lower engagement strips 22a and 22b and a pair of opposed side plates (not designated) interconnecting the engagement strips 22a, 22b at opposite ends. The engagement strips 22a, 22b are engageable with the body of the flexible plastic tube container T when the tube container T is wound on the spool body 16 for a purpose described below. The bearing portions 24 have a pair of aligned bearing holes 26, respectively, through which the spool body 16 extends. The container holder 14 is made from a synthetic resin and resiliently deformable as a hole. Preferably, the upper engagement strip 22a or the lower engagement strip 22b is separable from one of the side plates of the holder body 22 and can be locked, by snap-fitting for example, with the same side plate so that the container holder 14 can be developed or spread into a substantially flat single sheet. The spreadable container holder can readily be manufactured by molding and is handy to transport.

The bearing holes 26 of the respective bearing portions 24 have a diameter slightly smaller than the outside diameter of the spool body 16. Each of the bearing portions 24 has a plurality of slits 28 extending radially outwardly from the corresponding bearing hole 26. The spool body 16 is press-fitted into the bearing holes 26 so that the spool body 16 is rotatable against a friction acting between the spool body 16 and the peripheral walls of the bearing holes 26. The spool body 16 may have two or more longitudinal slots 20 in which instance the spool body 16 is radially inwardly deformable when it is press-fitted into the bearing holes 26 of the container holder 14. In addition, the spool body 16 is rotatable against friction acting between the spool body 16 and the peripheral walls of the bearing holes 26. The slits 28 in the bearing portions 24 may be omitted. In the case of the spool body 16 having a single longitudinal slot 20, it is preferable that the spool body 16 is made from a resilient material and capable of resiliently contracting and expanding in the radial direction.

In the embodiment described above, the bearing holes 26 have a circular shape. This is not restrictive but illustrative. The bearing holes 26 may have any other shape including polygon on condition that a friction is produced between the spool body 16 of the spool 12 and the peripheral walls of the bearing holes 26 when the spool body 16 is caused to rotate and also while the spool body 16 is rotating.

Figure 4:
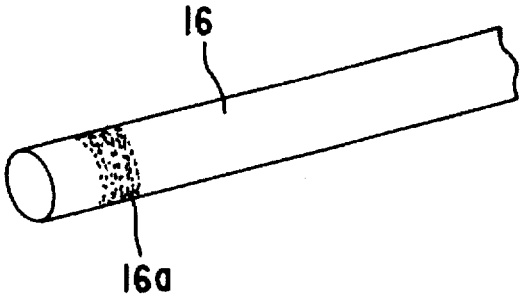
FIG. 4 is a fragmentary perspective view of the body of a spool having a friction means.
Figure 5:
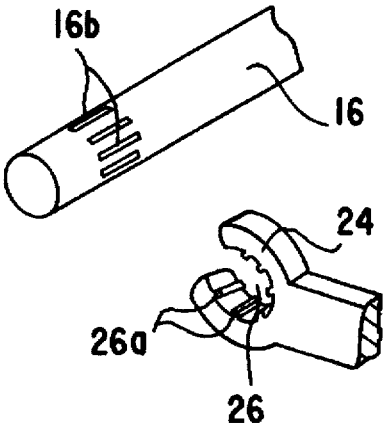
FIG. 5 is a fragmentary perspective view showing a modified form of the friction means which is provided on the body of a spool and the bearing portion of a container holder of a squeezing tool.

The squeezing tool 10 may further have a friction means or element for exerting a friction on the spool body 16 when the spool body 16 is caused to rotate. The friction means may be provided on either one or both of the peripheral walls of the bearing holes 26 an the spool body 16. As shown in FIG. 4, the friction means may comprise a roughened outer surface 16a formed by a satin-like finish on a portion of the spool body 16 which is received in each of the bearing holes 26. Alternatively, the friction means may include, as shown in FIG. 5, a row of teeth 16b formed on the outer surface of the spool body 16 at a portion received in each bearing hole 26 and/or a row of teeth 26a formed on the peripheral wall of each bearing hole 26. The bearing portion 24 shown in FIG. 5 is generally C shaped. The friction means 16a, 16b, 26a thus provided produces a friction which acts between the spool body 16 and the bearing portions 24, and is large enough to prevent reverse rotation of the spool body 16 which would otherwise occur when the spool body 16 is subjected to a resilient force stored in a portion of the flexible plastic tube container wound on the spool body 16. The friction means shown in FIGS. 4 and 5 are not restrictive but illustrative. The roughened surface 16a shown in FIG. 4 may be provided on the peripheral wall of each bearing hole 26 in which instance the roughened surface 16a may further be used in combination with the teeth 16b on the spool body 16 shown in FIG. 6. The teeth 26a on the peripheral wall of each bearing hole 26 may be used in combination with the roughened surface 16a on the spool body 16.

Figure 6:
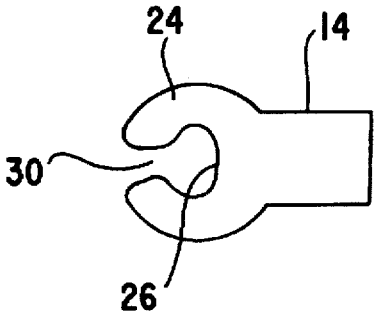
FIG. 6 is a side view of a bearing portion of a container holder according to another embodiment of this invention.

The bearing portion 24 shown in FIG. 6 is generally C shaped and has a cutout recess 30 contiguous to a bearing hole 26 in the C-shaped bearing portion 24. The C-shaped bearing portion 24 is advantageous over the annular bearing portion 24 shown in FIG. 1 in that the spool (not shown but identical with the spool 12 shown in FIG. 1) can readily be assembled with the container holder 14 by simply snapping the spool body 16 into the bearing holes 26 (only one shown) through the cutout recesses 30 (only one shown). The bearing holes 26 has a diameter slightly smaller than the outside diameter of the spool body 16 so that the spool body 16 is rotatable relative to the bearing portions 24 against friction acting therebetween.

Figure 7:
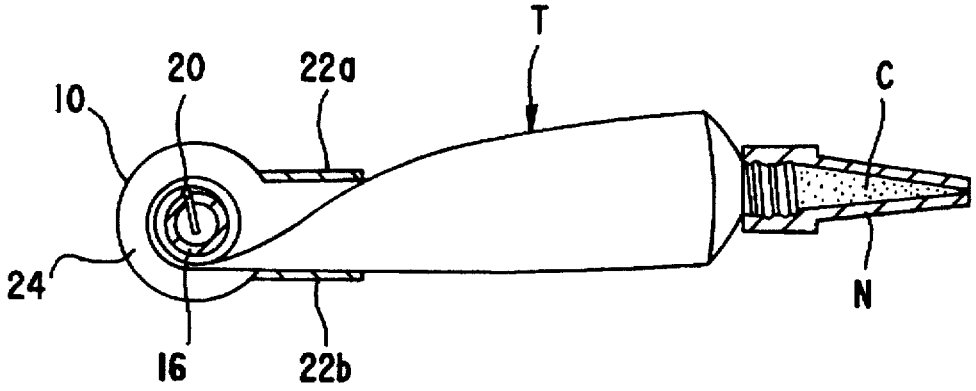
FIG. 7 is a cross-sectional view of the squeezing tool shown in FIG. 1 as it is used with a flexible plastic tube container for squeezing out a high-viscosity liquid from the tube container.

The squeezing tool 10 of the foregoing construction is used and operates in a manner described follows. The container holder body 22 of the squeezing tool 10 is fitted over a bottom end portion of the tube container T, and then the bottom end of the tube container T is received and locked in the slot 20 in the spool 12. While holding the tube container T with its one hand, the user rotates the wing handle 18 in one direction to progressively wind up the tube container T on the spool body 16 from the bottom end of the tube container T. With this winding, a high-viscosity liquid C is squeezed out from the tube container T through a nozzle N screwed to a spout of the tube container T, as shown in FIG. 7. During that time, the container holder 14 tends to rotate in the same direction (winding direction) as the spool body 16, however, rotation of the container holder never occurs because the container holder is kept immovable due to the abutting engagement between the engagement strip 22a with the tube container T. When the wing handle 18 is released, the spool 12 is urged to rotate in the opposite direction by a resilient force stored in a portion of the tube container T wound on the spooled body 16. However, partly due to a friction acting between the spool body 16 and the bearing portions 24, and partly due to the abutting engagement between the engagement strip 22b and the tube container T, the spool body 16 is kept immovable against rotation relative to the container holder 14. The reverse rotation of the spool body 16 can be avoided more positively when the squeezing tool is provided with at least one of the friction means 16a, 16b and 26a shown in FIGS. 4 and 5. Instead of holding the tube container T, the container holder 14 may be held by the user while the tube container is wound on the spool 12 of the squeezing tool 10.

Figure 8:
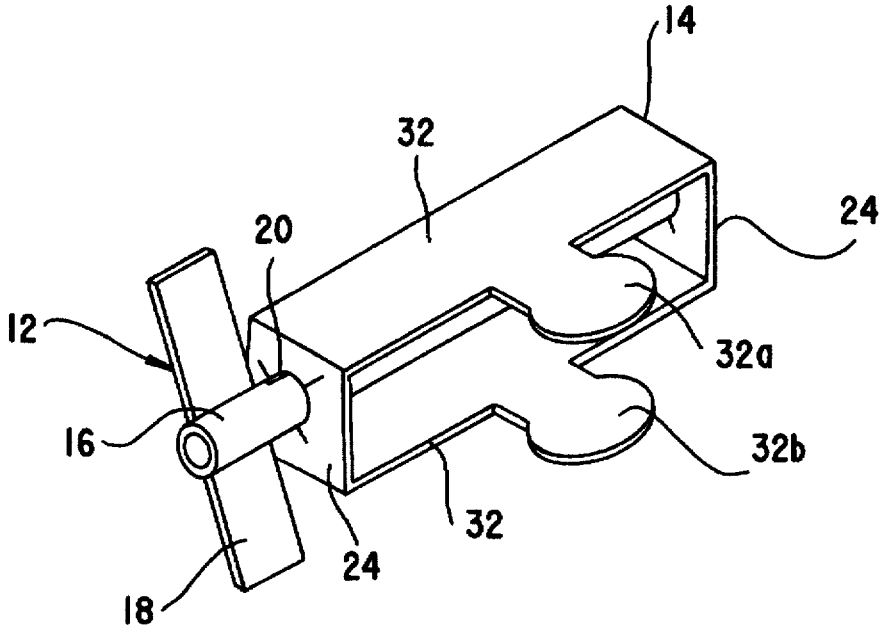
FIG. 8 is a perspective view of a high-viscosity liquid squeezing tool according to another embodiment of this invention.

FIG. 8 shows a squeezing tool according to another embodiment of this invention. This squeezing tool differs in the structure of a container holder 14 from the squeezing tool of the foregoing embodiment shown in FIG. 1. The container holder 14 has a rectangular hollow body 22 composed of a pair of opposed side plates 24, 24, and upper and lower elongate plates 32, 32 interconnected by the side plates 24, 24. The side plates 24 constitute bearing portions frictionally and rotatably supporting thereon the spool body 16. The container holder 14 further includes a pair of engagement wings 32a, 32b integral with and projecting from front edges of the upper and lower plates 32, 32, respectively. When the squeezing tool is in use, the engagement wings 32a, 32b are engageable with a body of the tube container T to prevent the tube container T from rotating about a longitudinal axis of the spool body 16.

The squeezing tool shown in FIG. 8 operates in the same manner as the squeezing tool 10 of the foregoing embodiment shown in FIGS. 1–3 and 7 and, therefore, a further description thereof can be omitted.

As described above, the squeezing tool of this invention includes a spool frictionally and rotatably supported by a container holder, and a pair of opposed engagement portions formed on the container holder for engagement with a flexible plastic tube container. The spool is manually rotated in one direction against a friction acting between a spool body and bearing portions of the container holder, so as to wind up the tube container on the spool body from the bottom thereof. With this winding, a high-viscosity liquid is squeezed out from the tube container. When a manual rotational force or torque on the spool is released, a resilient force stored in a portion of the flexible plastic tube container urges the spool to turn in the opposite direction. However, partly due to the friction acting between the spool body and the bearing portions, and partly due to the engagement between one of the engagement portions and the tube container, the spool is held immovable relative to the container holder and, hence, unwinding of the tube container can never occur.

Obviously various minor changes and modifications of the present invention are possible in the light of the above teaching. It is therefore to be understood that within the scope of the appended claims the invention may be practiced otherwise than a specifically described.

What is claimed is:

1. A tool for squeezing out a high-viscosity liquid from a soft plastic tube container, said tool comprising:

a spool having a longitudinal slot for receiving and locking therein a bottom of the soft plastic tube container;

a pair of opposed bearing portions formed so as to frictionally engage and rotatably support said spool; and a pair of opposed engagement portions integral with said bearing portions and engageable with the tube container wherein said bearing portions in conjunction with said engagement portions keep the tube container immovable against rotation about a longitudinal axis of said spool when the flexible plastic tube container is wound on said spool from the bottom thereof, wherein each of said bearing portions has a bearing hole oppositely aligned with each other, each bearing hole having a diameter slightly smaller than the outside diameter of said spool and a plurality of slits extending radially outwardly therefrom, and said bearing portions and engagement portions are formed of a resiliently deformable material.

2. A tool according to claim 1, wherein said engagement portions include a pair of opposed elongate strips and a pair of opposed side plates interconnecting the elongate strips at opposite ends, said bearing portions projecting contiguously from the side plates of said engagement portions.

3. A tool according to claim 2, wherein one of the elongate plates is detachably connectable to one of the side plates and lockable when connected to the one side plate.

4. A tool according to claim 1, further comprising:

a pair of opposed elongate plates wherein said bearing portions include a pair of opposed side plates interconnecting said elongate plates at opposite ends, and said engagement portions include a pair of opposed engagement wings each projecting from a forward side edge of a corresponding elongate plate.

5. A tool according to claim 1, wherein said spool includes a tubular body and is resiliently contractible in a radial direction.

6. A tool according to claim 1, wherein said spool has an integral handle at one end thereof.

*7. A tool for squeezing out a high-viscosity liquid from a soft plastic tube container, said tool comprising:*

*a spool having a longitudinal slot for receiving and locking therein a bottom of the soft plastic tube container;*

*a pair of opposed bearing portions formed so as to frictionally engage and rotatably support said spool;*

*a pair of opposed engagement portions integral with said bearing portions and engageable with the tube container wherein said bearing portions in conjunction with said engagement portions keep the tube container immovable against rotation about a longitudinal axis of said spool when the flexible plastic tube container is wound on said spool from the bottom thereof;*

*said bearing portions being generally C shaped, each of said C shaped bearing portions having a bearing hole and a cutout recess contiguous to the bearing hole, said spool being snap-fitted into the bearing hole through the cut-out recess; and*

*friction means disposed on at least one of said spool and said bearing portions for producing friction acting between said spool and said bearing portions, said friction means being formed so as to prevent said spool from rotating in an opposite direction relative to said bearing portions.*

*8. A tool according to claim 7, wherein said friction means includes a roughened outer surface of a portion of said spool supported by each of said bearing portions.*

*9. A tool according to claim 7, wherein said friction means includes a row of teeth formed on a peripheral wall of said bearing holes.*

*10. A tool according to claim 7, wherein said friction means includes a roughened outer surface of a portion of said spool supported by each of said bearing portions and a row of teeth formed on a peripheral wall of said bearing holes.*

*11. A tool according to claim 7, wherein said engagement portions includes a pair of opposed elongate strips and a pair of opposed side plates interconnecting the elongate strips at opposite ends, said bearing portions projecting contiguously from the side plates of said engagement portions.*

* * * * *